United States Patent
Weiss et al.

(10) Patent No.: US 7,496,558 B2
(45) Date of Patent: *Feb. 24, 2009

(54) METHOD AND SYSTEM FOR MAPPING AND SEARCHING THE INTERNET AND DISPLAYING THE RESULTS IN A VISUAL FORM

(75) Inventors: Dov Weiss, Kiriat Ono (IL); Aviv Segev, Kfar Saba (IL)

(73) Assignee: E-Nvent USA Inc., Coconut Grove, FL (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/453,204

(22) Filed: Jun. 14, 2006

(65) Prior Publication Data
US 2006/0277200 A1 Dec. 7, 2006

Related U.S. Application Data

(63) Continuation of application No. 09/814,399, filed on Mar. 22, 2001, now Pat. No. 7,085,753.

(51) Int. Cl.
G06F 17/30 (2006.01)
G06F 17/00 (2006.01)

(52) U.S. Cl. .............................. 707/2; 707/3; 707/104.1

(58) Field of Classification Search .................. 707/1–3, 707/10, 104.1; 709/217; 345/418, 419
See application file for complete search history.

(56) References Cited

U.S. PATENT DOCUMENTS 5,297,039 A 3/1994 Kanaegami et al.
5,764,906 A 6/1998 Edelstein et al.
5,870,559 A 2/1999 Leshem et al.
5,875,446 A 2/1999 Brown et al.
5,924,090 A 7/1999 Krellenstein
5,956,039 A 9/1999 Woods et al.
5,978,847 A 11/1999 Kisor et al.
6,101,537 A 8/2000 Edelstein et al.
6,338,058 B1 1/2002 Jacobson et al.
6,360,235 B1 3/2002 Tilt et al.
6,397,219 B2 5/2002 Mills
6,434,556 B1 8/2002 Levin et al.
6,466,970 B1 10/2002 Lee et al.

OTHER PUBLICATIONS

Loren Terveen et al, "Constructing, Organizing, and Visualizing Collections of Topically Related Web Resources", ACM Transaction on Computer-Human Interaction, vol. 6, No. 1, Mar. 1999, pp. 67-94.*

* cited by examiner

*Primary Examiner*—Uyen T. Le
(74) *Attorney, Agent, or Firm*—Merchant & Gould P.C.

(57) ABSTRACT

The invention relates to a method for visually presenting a set of properties of a web site, which comprises: (a) predefining within a provider's search engine a set of properties and assigning to each property a visual symbol; (b) using a spider program, visiting by said provider's search engine each web site and determining those properties from said set that are characteristic to that web site; (c) associating by said provider's search engine with each web site those symbols corresponding to said determined properties; (d) forming for each web site a corresponding combined visual representation of the web site based on said associated symbols; and (e) when listing search results to a user, including the combined visual representation for each web site respectively.

5 Claims, 12 Drawing Sheets

Fig. 1
*Prior art*

Yahoo! Category Matches  (1 - 20 of 37)

Recreation > Games > Board Games
- Chess

Recreation > Games > Board Games > Chess
- Chess Servers

Recreation > Games > Computer Games > Titles > Recreation and Sports > Board Games
- Chess Recreation > Games > Board Games
- Xiangqi (Chinese Chess)

Recreation > Games > Computer Games > Genres > Strategy
- Chess

Recreation > Games > Board Games > Chess > Chess Servers
- Internet Chess Server (ICS)

Business and Economy > Shopping and Services > Games > Board Games > Specific Games
- Chess Recreation > Games > Board Games > Chess
- Correspondence Chess Computers and Internet > Hardware > Systems > Macintosh > Software > Games
- Chess

METHOD AND SYSTEM FOR MAPPING AND SEARCHING THE INTERNET AND DISPLAYING THE RESULTS IN A VISUAL FORM

This application is a Continuation of application Ser. No. 09/814,399 filed on Mar. 22, 2001 now U.S. Pat. No. 7,085,753, and which application is incorporated herein by reference.

FIELD OF THE INVENTION

The present invention relates to the field of search engines and Directories of Web sites. More particularly, the invention relates to a method and system for mapping and searching the Internet, and displaying the results a visual form.

BACKGROUND OF THE INVENTION

A "Search engine" is a system that searches for information that sustains some Search criteria. Regarding the Internet, a Search engine is a Web application that searches Web sites that sustain some Search criteria.

A search engine on the Internet usually comprises three parts:
- A Spider-program (also called a "crawler" or a "bot"), which is a program that "visits" Web sites and reads their pages and other information in order to create entries for a search-index;
- An Index-program, a program that compiles a massive search-index from the pages read; and
- A Seeker-program, a program that receives search requests, compares each request to the entries in the search-index, and returns the results to the user.

A search-index is a database that contains information about a set of Web sites. Using the search-index, a sub-group of Web-site(s) can be obtained according to search-criteria.

There are various search Web-sites that maintain databases about the contents of other Web sites. Yahoo was the first search Web site to gain worldwide attention, and it differs from most other search sites in that its content is indexed by people who create a hierarchical directory by subjects. As a result, Yahoo and similar search Web sites are technically called "directories" rather than "search engines". Most directories offer a search engine mechanism to query the database.

Most other search Web applications are highly automated, sending "Spider" programs out on the Web around the clock to collect the text of Web pages. Spiders follow all the links on a page and put all the text into a database. Sometimes a Web site offers both—a search engine and directory capabilities.

Major search engines such as AltaVista and Google index the content of the Web, while directories such as Yahoo and Looksmart try to categorize it manually. However, due to the huge size of the Web and other objective reasons (such as connectivity of sites), Google indexed only 30% of the Web, while Yahoo indexed only 2% (according to the assessments of the Web size)

There are dozens of search engines, each with its own anchor Web site. Some search Web applications, such as Yahoo, search not only using their search engine but also provide the results from simultaneous searches of other search indices.

Usually, the above-mentioned search engines do not provide focused answers, since the same keywords may be found in Web sites of different categories and subjects, while the user is not provided with means for distinguishing between the results. Search results can span for pages, and consequently overwhelm the user.

Figure 1:
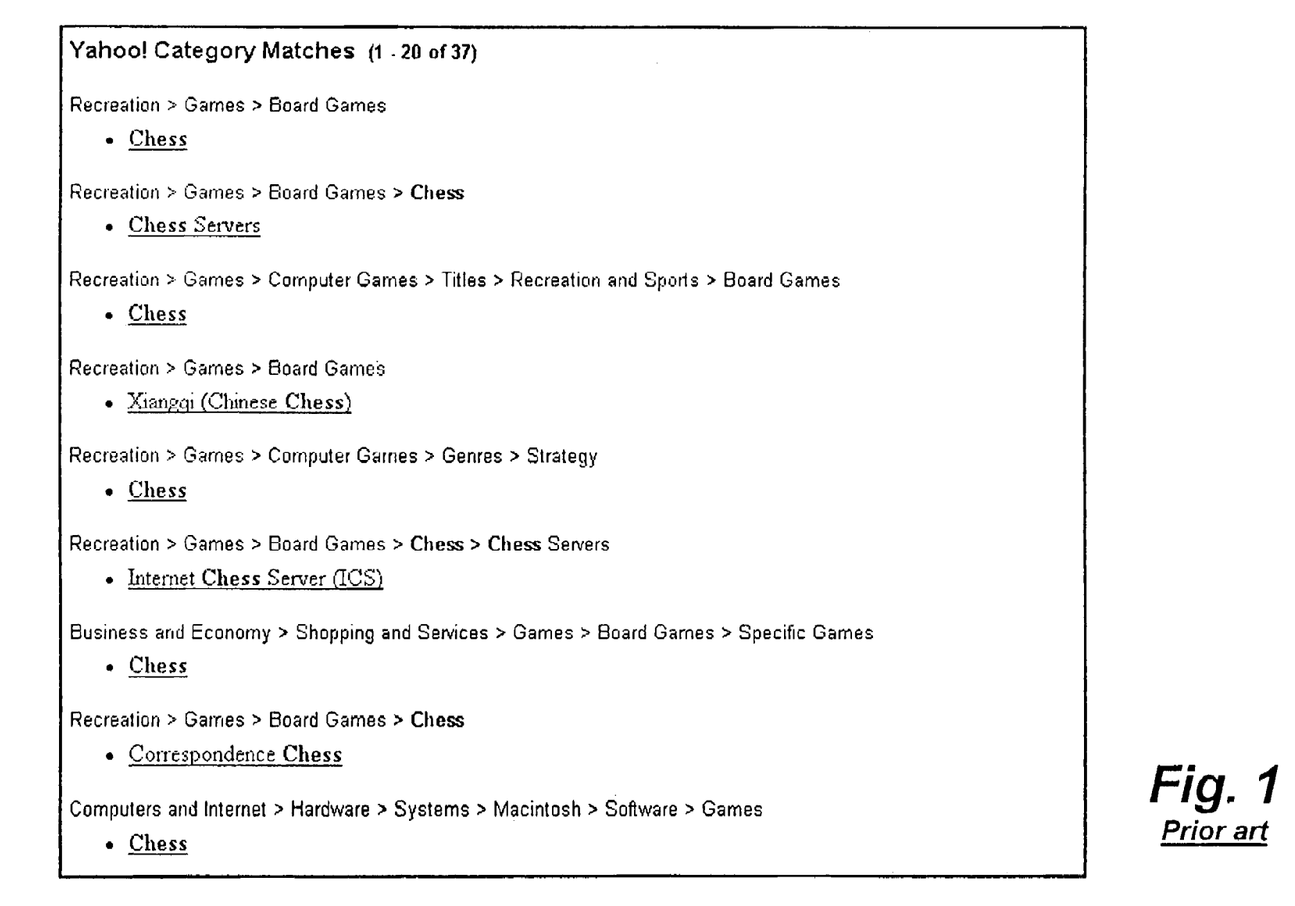
FIG. 1 schematically illustrates a hierarchically ordered list of categories that contain the keyword "chess", according to the prior art.

Yahoo displays not only Web sites that contain the specified keywords, but also a list of categories that contain the searched keyword(s), as may be seen in FIG. 1. In the illustrated case, the word "chess" was searched. Hence, after obtaining the initial results, the user can focus his search by selecting the category best suited to the subject matter he is looking for. In that case, the search results are limited to the selected category as pre-grouped by the people of Yahoo. Such a search may be called a "context search". However, the user is not provided with means for distinguishing the Web sites by importance or any other property. Moreover, since Yahoo does not scan the Internet by automated methods, each category contains a minor amount of Web sites.

Due to the fact that the categories of Yahoo were defined by a human factor and not by a machine, there are some ambiguities. For example, in FIG. 1, the hierarchy of the categories "Computers and Internet>Hardware>Systems>Macintosh>Software>Games" is odd since regarding to computers, the category "Software" is not a sub-category of "hardware".

One of the options of the Google search engine, introduces a different approach. The search starts from a selection of one or more predefined categories and the search refinement is carried out by the topical keywords. For example, a user wishes to search for a free computer chess game. The user starts the search from a Web page (within the Google Web site) called "Web directory", where he selects the category "Games". Google displays a list of sub-categories, and the user selects the "Computer games" sub-category. The next category is "Windows", and in this category Google displays the following answers: 3D Graphics (18 Web sites), Cheats and Hints (46 Web sites), Downloads (21 Web sites), Fan Fiction (11 Web sites), and Shareware (146 Web sites). When selecting the final directory, the user submits the keyword "chess" to limit the results to only chess games.

In matter of fact, Google uses the directory of Open Directory Project (ODP), rather then its own directory. ODP is an organization of more than 30,000 volunteers that index the Internet.

Google results are ranked quite differently from those of other search engines. Ranking in Google is carried out according to the site's importance as determined by the number of links pointing to a Web site. After obtaining a list of Web sites that meet a text-oriented search criterion, Google ranks the obtained list according to the number of links pointing to each Web site, and the results are presented according to this order.

The main drawbacks in the existing search engines are the following:
- The number of the results corresponding to a search criterion is often high, and consequently overwhelms the user.
- They do not provide easy means for distinguishing and noticing the results by their related content or subject.
- The presentation of results is text-oriented, while presenting such an enormous amount of information overwhelms the user.
- Although Google orders the search results by their importance (the number of links pointing to a Web site) this is not a precise criterion for the site's relevancy to the search goal, because the preliminary Web sites being ranked by Google was pulled out by text-oriented search criteria.

The human-compiled tree of categories is subjective and not objective.

Low cover rate at human-compiled directories (such as Yahoo and Looksmart).

All the methods described above have not yet provided satisfactory solutions to the problem of the searching of Internet Web sites.

It is therefore an object of the present invention to provide a method and system for carrying out a search of Web sites, which overcomes the drawbacks of the prior art.

It is another object of the present invention to provide a method and system for carrying out a search of Web sites, which provides presentation of the Web sites, such that the visualization reveals certain attributes of the presented Web sites.

It is a further object of the present invention to provide a method and system for carrying out a search of Web sites, which classifies the Web sites according to their attributes.

Other objects and advantages of the invention will become apparent as the description proceeds.

SUMMARY OF THE INVENTION

In one aspect, the present invention is directed to a method for carrying out a search of Web sites according to a search criteria, comprising: pre-indexing the sites of the Web, including grouping the Web sites according to predefined group-criteria; pre-classifying each Web site according to a predefined set of properties; pre-visual-formulating each Web site according to its identified properties; and upon searching of Web sites that sustain a search criterion, displaying the formed site results divided into the pre-indexed groups wherein each site within a group is displayed according to its visual-formulation.

Preferably, the grouping is carried out by a clustering process and the group-criteria is of a function among others the number of hyperlink(s) pointing from and to each the Web sites.

Preferably, the set of properties comprises parameters relating to the site's importance, the nature of the site's owner, the existence of an e-store within the site, the existence of a "chat room" within the site, the existence of a forum within the site, the existence of multimedia file(s) and/or their amount and/or size within the site, the frequent used keywords in the textual data of the site, whether the site in "official", the essence of the site, and/or the amount of information in the site.

Preferably, the importance of a Web site is a function of the hyperlinks pointing to and from a Web site.

Preferably, the amount of information in a Web site is determined according to the number of characters, and/or the number of words, and/or the number of bytes included within the Web site.

Preferably, the visual-formulation is a distinguishable visual presentation of the properties in a visual presentation.

Preferably, each Web site is presented as a building, the height of the building is proportional to the importance of the Web site represented by it.

Preferably, wherein each Web site is presented as a building wherein the width of the building is proportional to the amount of information within the Web site.

Preferably, a commercial Web site is presented as an office-type building.

Preferably, a personal Web site is presented as a house.

Preferably, each Web site is presented as a building wherein a Web site owned by an academy and/or college and/or school is presented as a campus-type building.

Preferably, wherein the presence of an e-store in a Web site is presented as a display-window at the building.

In another aspect, the invention is directed to a method for visually presenting a set of properties of a Web site, comprising: associating to each of the properties distinguishable graphical representation within a Web site; and displaying the graphical representation within a Web site representation.

Preferably, the graphical representation is presented in 2D or 3D.

Preferably, the Web site representation is a building.

Preferably, a group of Web sites is presented as a street and each Web site in the group is presented as a building.

In another aspect, the invention is directed to a method for finding sub-groups having a common basis in a set of Web sites, comprising: clustering the set of Web sites by determining groups having a common basis by their being related by hyperlink(s) pointing to and from each of the Web sites; and labeling the determined groups by analyzing their content.

Preferably, the analyzing is carried out by detecting keywords frequently used in a determined group.

In another aspect, the invention is directed to a system for searching of Web sites in the Internet, comprising: a Spider application, for scanning the Web sites of the Internet; a Database application, for storing the information collected by the Spider application; an Indexing application, for grouping, and/or for labeling and/or for classifying the found Web sites; and a Seeker application, for searching of Web sites that sustain a search criteria by querying the Database according to the search criteria.

Preferably, the system comprises a visual formulating application, for visually formulating each of the Web sites according to the classification and displaying the same to a user.

DETAILED DESCRIPTION OF PREFERRED EMBODIMENTS

In order to facilitate the reading of the description to follow, a number of terms and initials are defined below:

- A Search engine is a system that searches for information that sustains some Search criteria. Regarding the Internet, a Search engine is a Web application that searches for Web sites that sustain some Search criteria.
- A search criterion is a rule for which Web pages of the Internet are checked. The rule is a mathematical expression combined of logical Operator(s) and Operand(s). The Operand(s) are word(s) and/or their synonyms. For example, if W1, W2 and W3 are words, the Search criterion can, for example, be the existence of the rule (W1 or (W2 and W3)) in the content of a Web site. Another example for a search criterion: (W1 and (W2 or W3)).
- A Heuristic method is a means for solving a problem that does not guarantee a good solution all the time, but generally does provide such. A Heuristic method is a group of rules, suggestions, guides, or techniques that may be useful in making progress toward the solution of a problem.
- Classification means assigning items to one of a set of predefined classes of objects based on a set of observed features. For example, one might determine whether a particular mushroom is "poisonous" or "edible" according to its color, size, and gill size. Classifiers can be learned automatically from a set of examples through supervised learning. Classification rules are rules that discriminate between different partitions of a database based on various attributes within the database. The partitions of the database are themselves based on an attribute called the classification label (e.g., "faulty" and "good").
- Indexing is the operation of compiling a massive search-index of the sites of the Internet.
- Clustering is an approach to place objects into meaningful groups based on their similarity. Clustering, unlike classification, does not require the groups to be predefined. Alternatively, the clustering applies an algorithm to determine obvious or hidden groupings of data items. The object of applying clustering algorithms is to discover useful but unknown classes of items. Clustering methods are implemented, for example, in artificial intelligence and data mining.
- Data structure is the physical layout of data. Data fields, memo fields, fixed length fields, variable length fields, records, word processing documents, spreadsheets, data files, database files and indices are all examples of data structures.
- A Linked list is a group of data items, each of which points to the next item. It allows for the organization of a sequential set of data in noncontiguous storage locations.
- A tree structure is an algorithm for placing and locating data entities in a database. The algorithm finds data by repeatedly making choices at decision points called nodes. A node can have as few as two branches (also called "children"), or as many as several dozen. In a tree, records are stored in locations called leaves. This name derives from the fact that records always exist at end points; there is nothing beyond them.
- The starting point is called the root. The maximum number of children per node is called the order of the tree.
- The Internet, or WWW (World Wide Web), is a worldwide system of computer networks—a "network of networks" in which users at any one computer can, if they have permission, receive information from any other computer.

Figure 2:
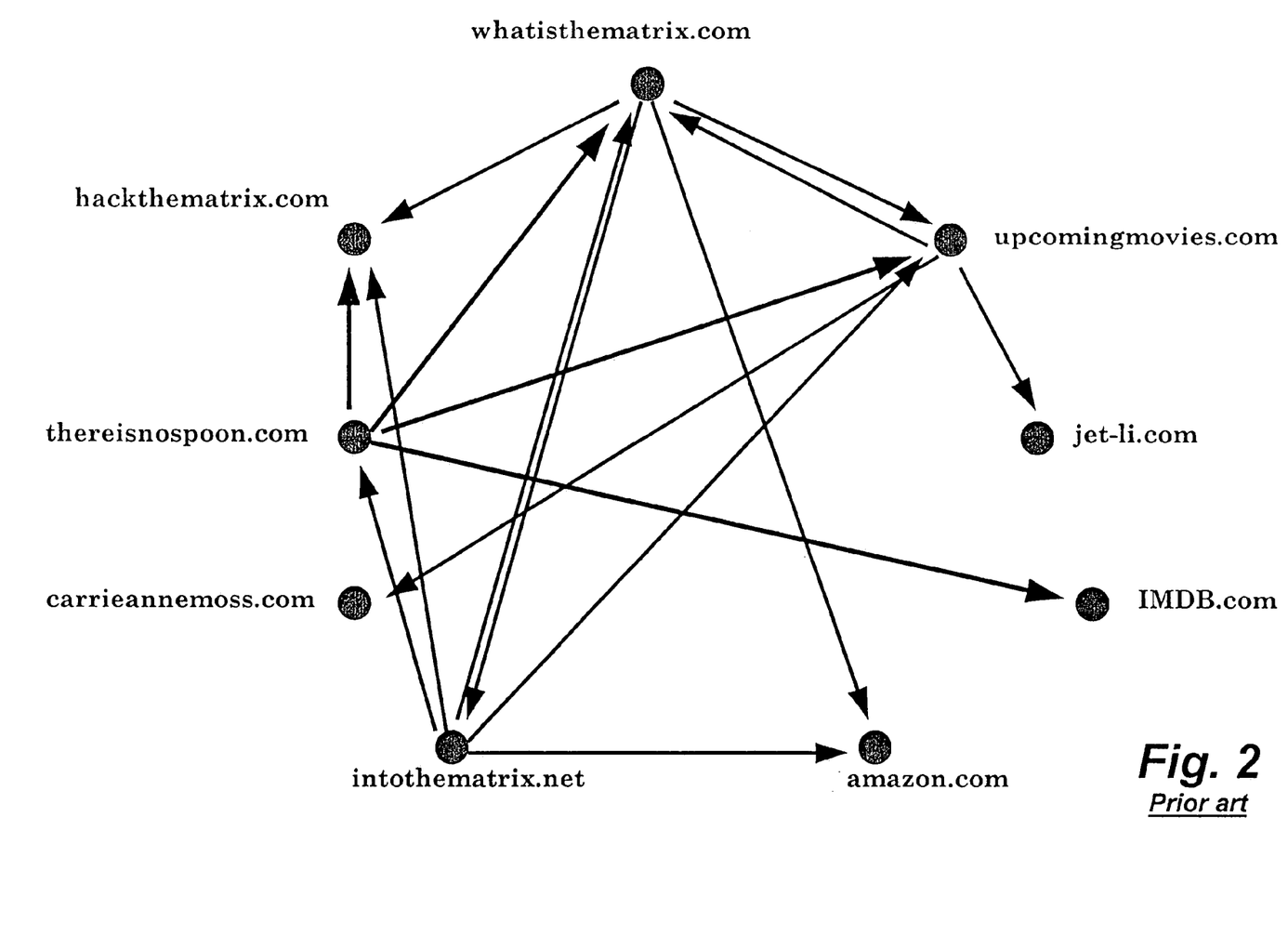
FIG. 2 schematically illustrates a theoretical example of a collection of Web sites that are related to the movie "The Matrix", according to the prior art.

FIG. 2 schematically illustrates a theoretical example of a collection of Web sites that are related to the movie "The Matrix". The Web sites are:

whatisthematrix.com, the official Web site of the movie (e.g., which is owned by the producer of the movie);

upcomingmovie.com the Web site which contains information regarding the upcoming sequent movie;

amazon.com the site where the book on which the movie is based on can be bought;

jet-li.com the Web site of the director of the movie;

carrieannmoss.com the Web site of the major actress;

some corresponding amateur Web sites, and so forth.

As is well known, there are connections, generally called "links" or "hyperlinks", which refer Internet users from one Web site to other Web site(s). Actually, links point from one Web page to another Web page, or even to the same Web page, however since Web sites comprise Web pages, we can assume that a link points from one Web site to another Web site, or even to the same Web site. For example, link L1 refers users from the Web site Si, where L1 resides on, to Web sites S2 and S3. L2 refer users to Web sites S1, S3 and S4, etc. Generally, links are made to "connect" between Web sites. Furthermore, the more links point to a Web site, the higher its popularity. In other words, a Web site to which more links refer, maybe considered as more "important" than a Web site to which fewer links refer. In that sense, the Web site whatis.thematrix.com to which 3 links refer, is more "important" or "popular" than the Web site jet-li.com. Furthermore, all the Web sites of FIG. 2 form a virtual group "connected" by a somewhat common subject.

Figure 3:
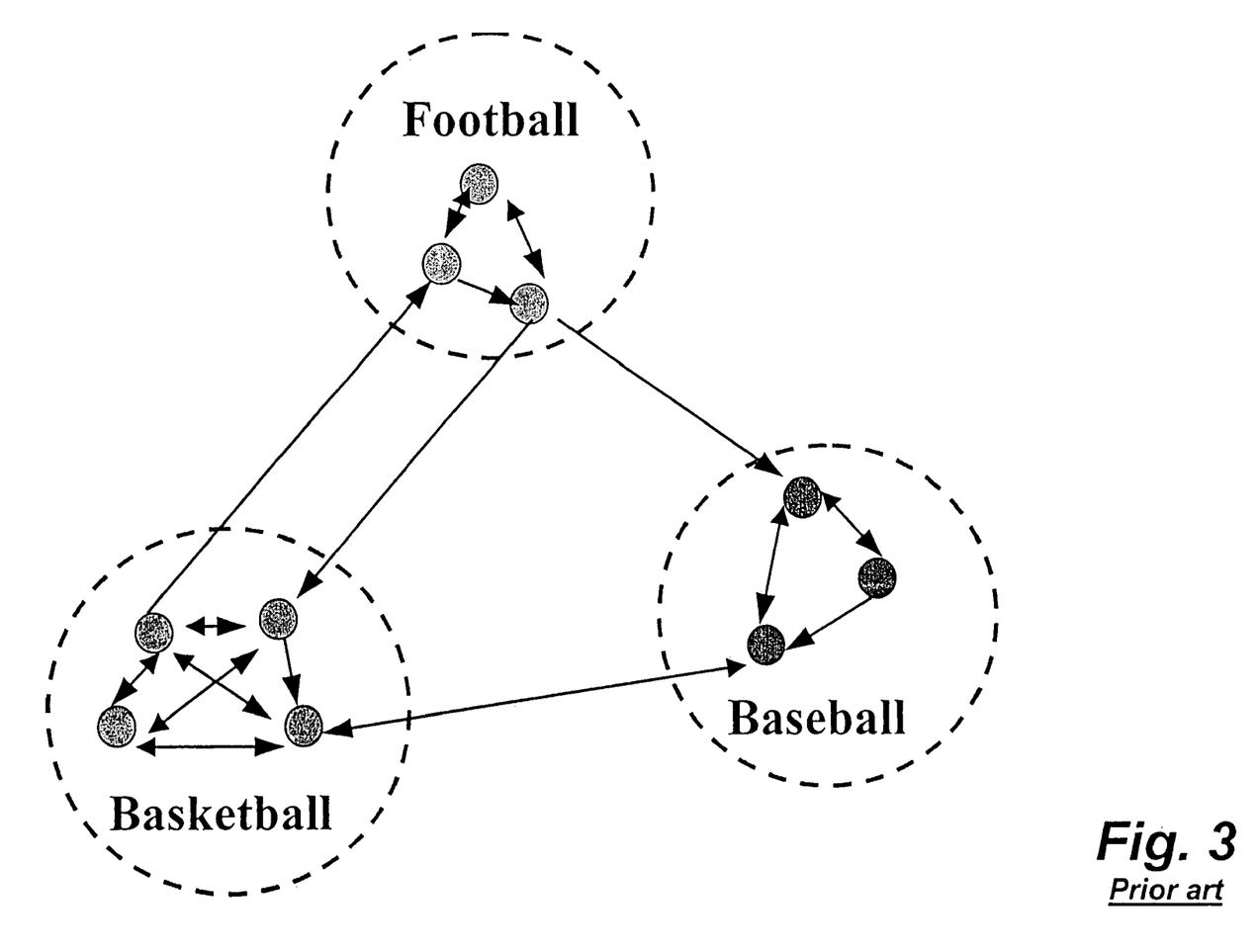
FIG. 3 schematically illustrates a theoretical example of hyperlinks in three related groups of Web sites: Football, Basketball and Baseball, according to the prior art.

FIG. 3 schematically illustrates a theoretical example of the hyperlinks in three related groups of Web sites: Football, Basketball and Baseball. The number of hyperlinks pointing between the members of the group are:

The Football group: 5 hyperlinks point between the members of the group, and 3 hyperlinks to/from the other groups.

The Basketball group: 11 hyperlinks point between the members of the group, and 3 hyperlinks to/from the other groups.

The Baseball group: 5 hyperlinks point between the members of the group, and 2 hyperlinks to/from the other groups.

Figure 4:
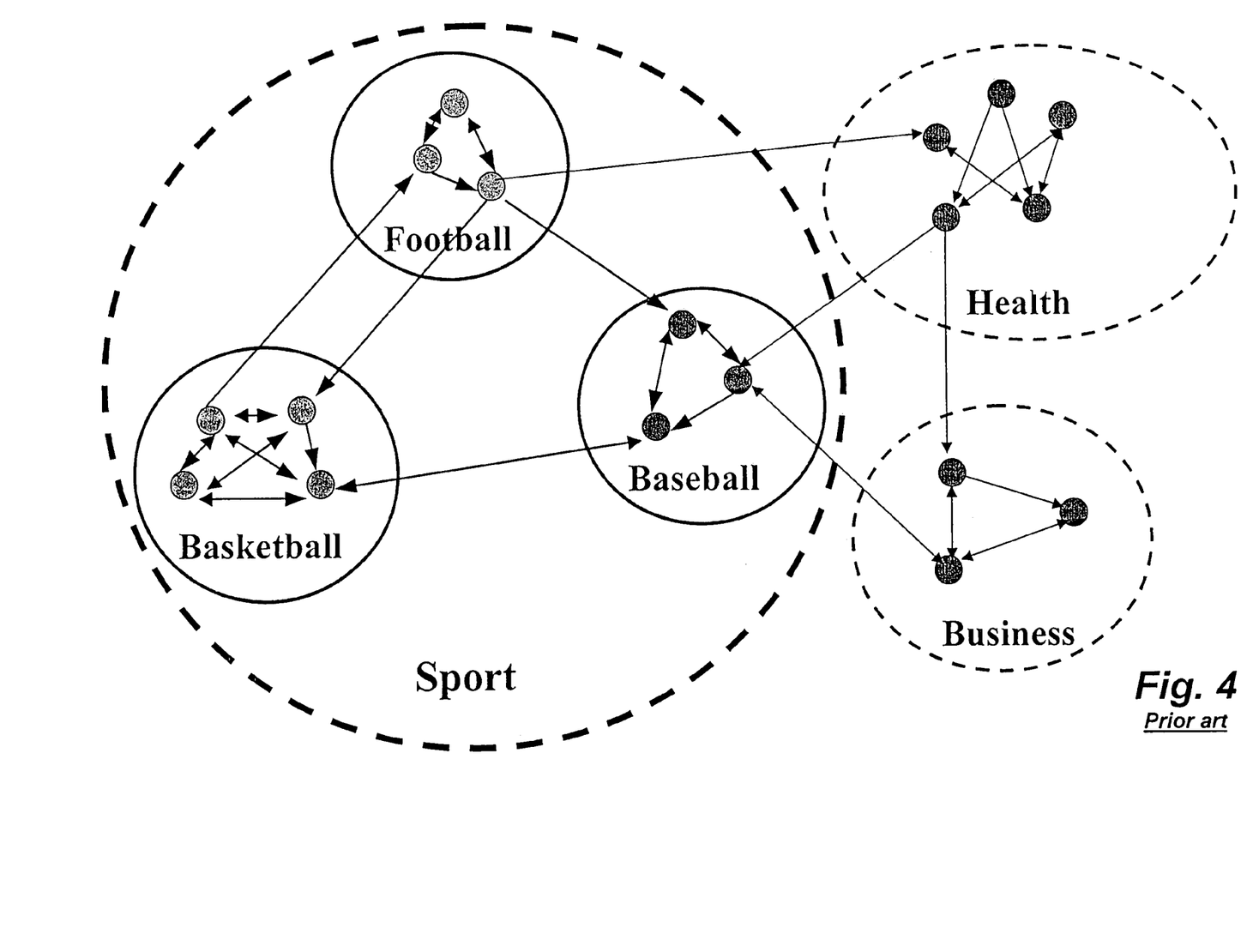
FIG. 4 schematically illustrates a theoretical example of a wider view of Web sites. There are three major groups: Sport, Health and Business, according to the prior art.

FIG. 4 schematically illustrates a theoretical example of a wider view of Web sites. The figure shows three major groups: Sport, Health and Business. The Sport group comprises three sub-groups: Football, Basketball and Baseball. Again, the presence of a group can be determined by counting the hyperlinks between a group and the hyperlinks pointing from/to a group and the outside world. It can be seen that most links in Web sites having a common subject remain in the group, and less point out of the group.

In this example, only three hyperlinks are pointing from/to the Sport group to the other groups, while the number of links pointing between the members of the group is much higher. The same is true at the Health and Business groups.

Indexing

Prior to carrying out a search, a great deal of the Internet Web sites should be indexed, by means of an indexing process. According to the present invention the indexing is carried out in two stages:

Clustering

The groups of the Web are determined according to the hyperlinks pointing to and out of the Internet sites. Since the grouping criteria is the hyperlinks (such as the number of hyperlinks, the density of hyperlinks, etc.), this is a totally objective process, in contrary to the prior art, where the groups are determined by a human factor or text-oriented, and hence the results were subjective. For a matter of fact, the clustering process is so indifferent to text, that even after the cluster formation, it is still unknown what is the topical common denominator of the new-formed group.

Determining the groups can be a lengthy process, since any possible combination of Web sites is to be checked. For example, if a set of 10 Web sites is checked, named as "A" to "J", then any combination should be considered, such as A,B; A,C; A,D; A,B,C; A,B,D; A,B,E; A,B,C,D,E; A,B,C,D,F; and so forth in order to determine groups. The decision as to when a group is formed is subject to an automatic decision based on statistical and/or mathematical parameters such as variance and significance in the link's density, variance, direction, proportion, etc.

The problem of grouping objects (not necessarily web entities) is well known in the art, and many algorithms were developed in order to speed up the process. In the prior art, the grouping process is called "Clustering".

Since the Internet comprises more than 100 millions of Web sites (billions of Web pages), automatic clustering of the Internet is long and heavy process, even when fast algorithms and fast computing machines are implemented. Therefore, according to the invention, the clustering is made prior to the carrying out of a search. The clustering is performed by a "clustering engine", which also works in the background.

Labeling

Another aspect of the clustering problem is naming the determined groups, in order to determine what is their subject, since the link-oriented grouping is indifferent to text, and therefore can not relate a subject title to the new formed groups. The process of entitling a group is called herein "Labeling". Such a process can be carried out by heuristic methods, with or without the assistance of a human factor.

Regarding the examples described in FIGS. 3 and 4, frequent appearance of the word "football", "basketball" and "baseball" in a cluster may lead to the conclusion that the cluster deals with a group of sport.

A step toward automatization of the Labeling process is carried out by determining the major words that appear in a cluster, and then relating the words to a subject.

Data Structure

Figure 5:
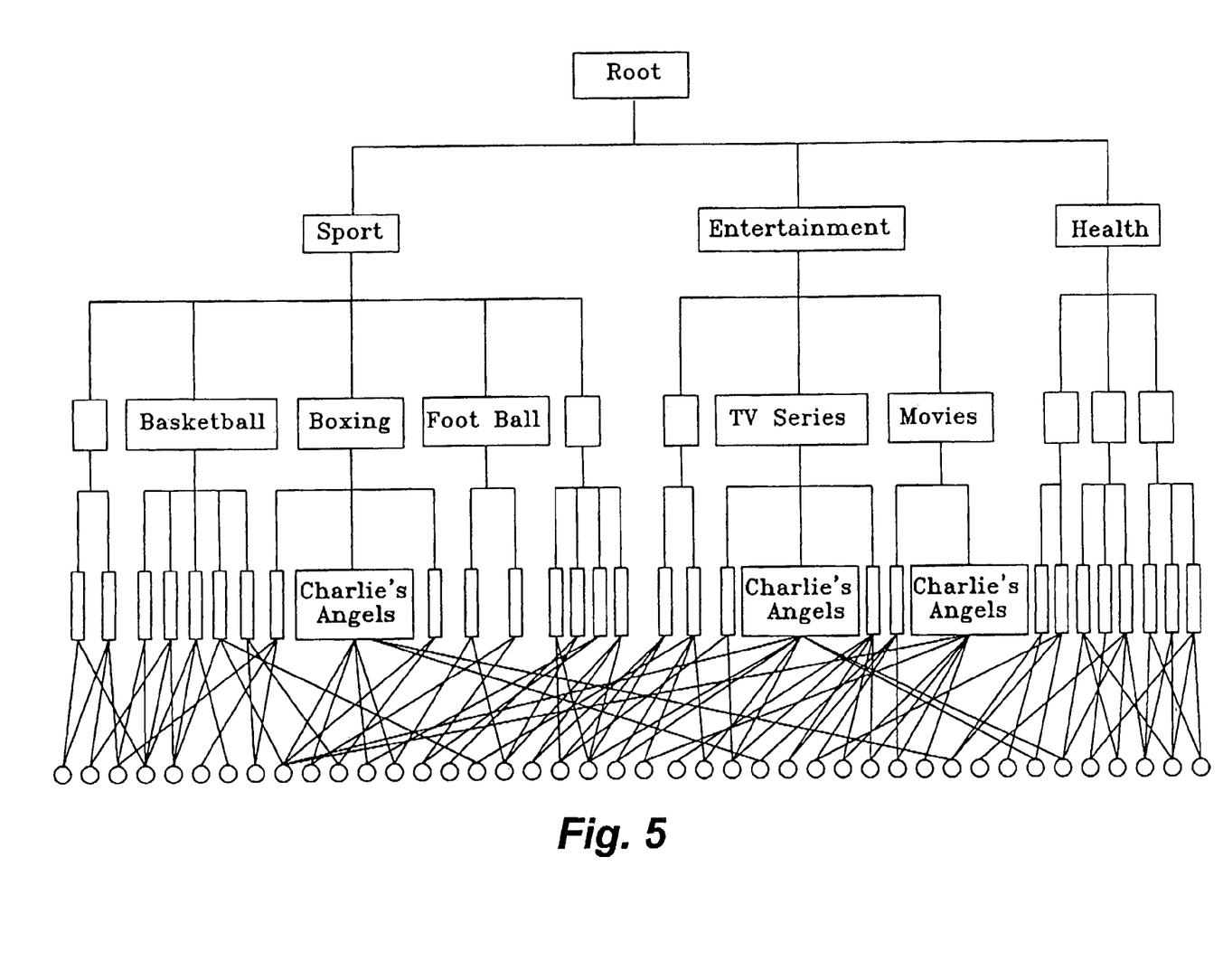
FIG. 5 schematically illustrates a theoretical example of clusters organized in a tree structure, according to an embodiment of the invention.

FIG. 5 schematically illustrates an example of clusters organized in a tree structure, according to an embodiment of the invention. The "Sport" cluster (or "group") contains several sub-clusters (or sub-groups)—Football, Basketball and Boxing sub-clusters, etc. The cluster "Charlie's Angels" appears as a sub-cluster of the TV Series cluster, as a sub-cluster of the movies cluster and as a sub-cluster of the boxing cluster (there is a boxing team that is called "Charlie's Angels"). The circles denote Web sites. A Web site can belong to several clusters.

The data structure created by the clustering process can also be seen as a map of the web, since every site in the web has a specific location in the tree.

Carrying Out a Search

The search process uses the search-index that was constructed in the indexing process. As much Web sites have been indexed, as much reliable the results of the search.

The process of searching starts from the major clusters of the search-index. For example, searching for Web sites regarding "Charlie's Angels" produces seventy Web sites in the Entertainment cluster and forty Web sites in the Sport cluster. If the subject is searched in relevance with entertainment, then the next search will be in the Entertainment cluster. Searching for Web sites regarding "Charlie's Angels" in the Entertainment cluster produces twenty Web sites in the TV Series cluster, forty Web sites in the Movies cluster, and ten Web sites in the rest of the clusters. The search is refined by selecting the movies cluster, and so forth.

Figure 6:
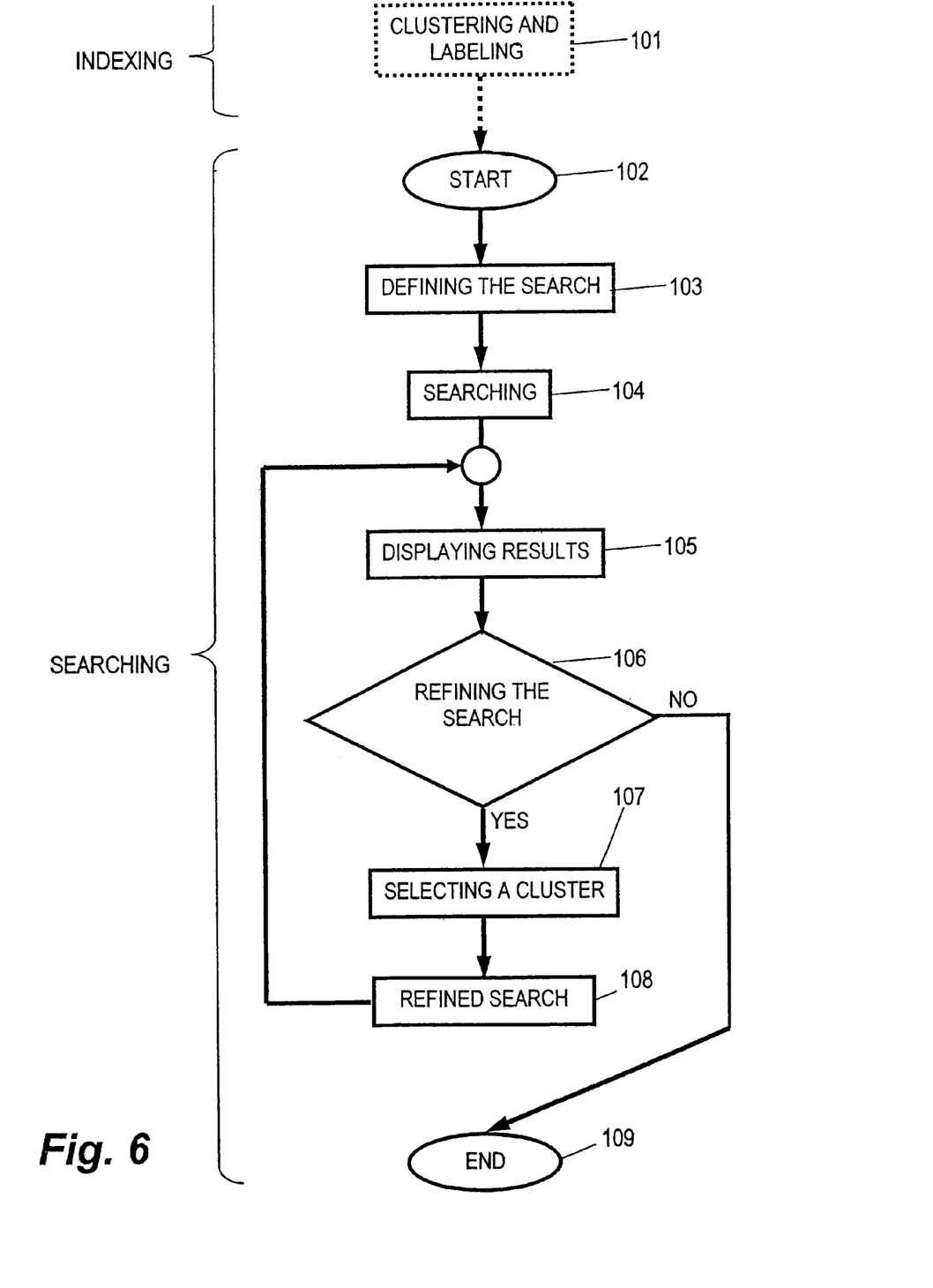
FIG. 6 is a high-level flow chart of a process for carrying out a search for Web sites, according to a preferred embodiment of the invention.

FIG. 6 is a high-level flow chart of a process for carrying out a search for Web sites, according to a preferred embodiment of the invention. The process is divided to two parts: Indexing and Searching. The Indexing process totally distinct from the searching process. While the indexing is a process carried out in order to prepare, order, and cluster the Internet for the search, the searching is a process that is initiated by an Internet user, which accesses the search site, uses a search engine. The Indexing can be carried out before and during the Searching process. The output of the Indexing process is used for the Searching process.

Indexing:
Marked as 101, is the process that is made by the searching facility that includes Clustering and Labeling. As a result, trees of Clusters are constructed. The Web sites of the Internet are scanned and the titles of the Web sites, the links and the addresses of the pages in which predefined keywords are found are stored in a database. Then, a Clustering algorithm is executed on the collected data in order to determine clusters. Then the detected Clusters are labeled by a Labeling process.

Searching:
The Searching, which is conducted by a user, starts at 102.
At 103, the user defines the search criteria.
At 104, the database is scanned in order to find the clusters (as defined at 101) contain clusters that meet the criterion.
At 105, the names of the clusters that contain instance(s) of the searched words are presented to the user. According to an embodiment of the invention, the tree of Clusters is such that each node contains, for example, about 8-10 branches.
At 106, after the user assesses the results, if he wishes to refine the search, the process continues with 107. Otherwise the process proceeds to its end at 109.
At 107, the user clicks on the pointing entity (usually a name or an icon presented on his display) associated with the desired cluster.
At 108, the sub group of the selected cluster that contains instances of the searched words is displayed to the user, and then the process returns to 105.
At 109, the process ends. At this stage, a list of Web sites is displayed to the user, and he may select the Web site to browse by clicking its hyperlink. It is preferable that the list will contain no more than tens of links. The presentation of hundred of links would overwhelm and confuse the user.

It should be understood that the process of refining the search may also be carried out by using the pre-classifying of the Web sites.

It is to be clear that the Indexing is a preliminary stage, and it is not carried out each time a search is performed.

Visual Presentation of Web Site's Attributes

In the prior art, hyperlinks to Web sites that have been found in a search are presented as a list. Some search engines also provide a rating number. Other search engines provide the paragraph (of the Web page) that includes the searched words. As a matter of fact, this type of presentation is one-dimensional. In order to make the list of the found Web sites more understandable and easier to analyze, the presentation of the list of Web sites is preferably carried out as follows:

According to a preferred embodiment of the invention, the Web sites of the Internet are categorized by predefined attributes. Then, on the presentation, the attributes will have a visual expression.

The following example presents some attributes by which Web sites can be categorized:
- Commercial/academic/private
- Comprises/does not comprise a virtual store;
- The amount of information
- Importance (which is determined by the number of links pointing to and from it).
- Etc.

Subjected Presentation

According to a preferred embodiment of the invention, the attributes of the Web sites found in a search are presented in a subjected visual presentation, possibly a 3D-dimensional. For example, according to one embodiment of the invention, all the Web sites are visualized in an urban form as follows:
- The Web sites are presented as buildings in a street.
- The importance attribute is expressed in the height of the buildings.
- The width of a building may reveal the amount of content.
- A display-window in a building may represent the existence of an e-store.
- If the Web site is owned by an enterprise, then it may be represented by an office type building. If the Web site is owned by a private person, the building may appear as a house. If the Web site is of an educational institute, it may be presented as a campus.
- And so forth.

A user that carries out a search may focus on the relevant Web pages by several steps wherein the street presentation is the last one of them. The steps are equivalent to the levels in a tree of clusters. According to an embodiment of the invention, each level may be presented as a geographical entity: a continent represents the highest level (Entertainment and Sport in FIG. 7). The next levels can be countries, cities, streets and buildings).

According to this approach, the search begins in a conventional manner by specifying the keywords with or without the logical terms between them (And, Or, Not, etc.). As a result, the user receives an illustration of the "continents" where the searched words have been found.

Figure 7:
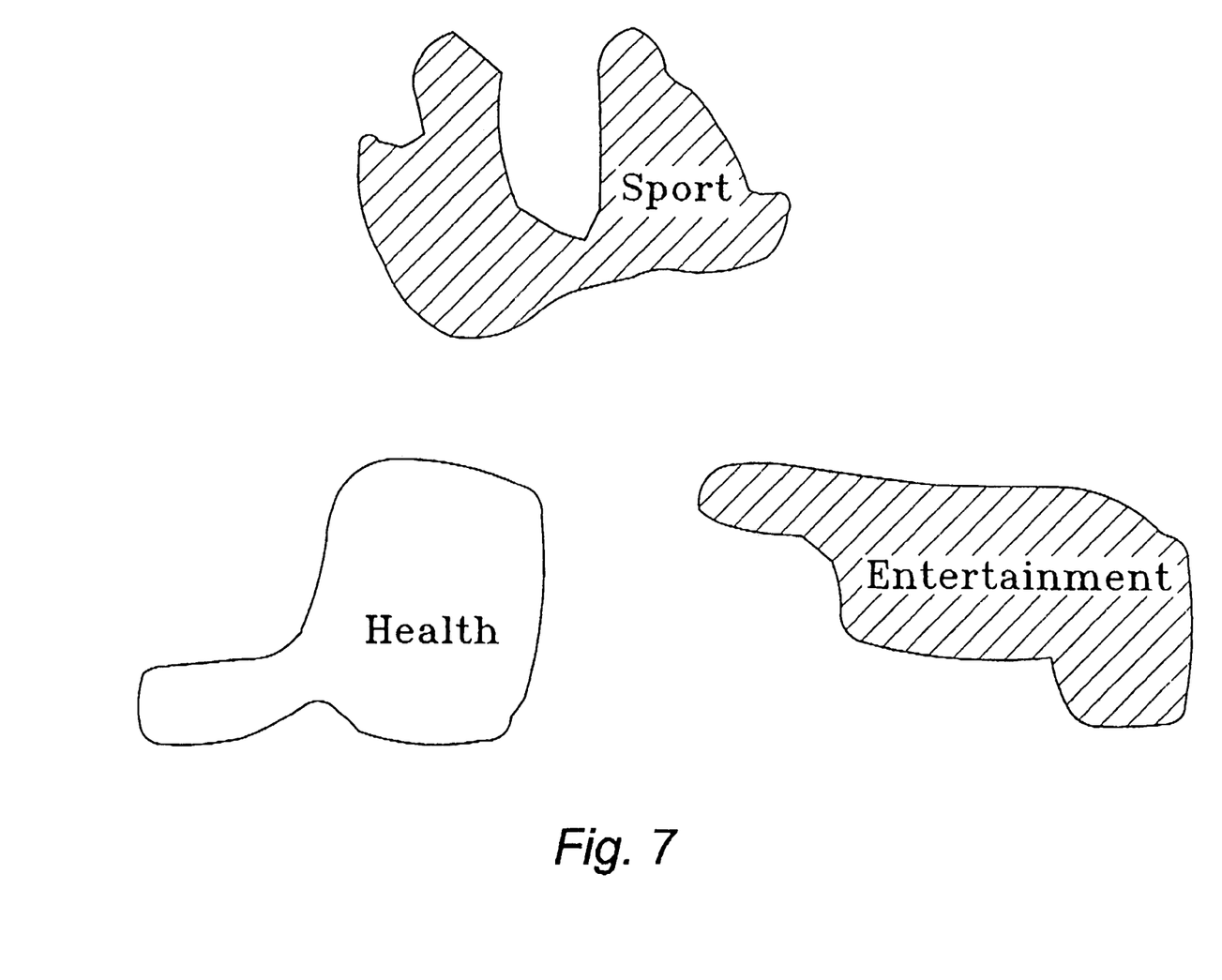
FIG. 7 schematically illustrates an example of a presentation of the first stage of a search, according to a preferred embodiment of the invention.

FIG. 7 schematically illustrates an example of a presentation of the results of the first stage of a search, according to a preferred embodiment of the invention. The search was for the phrase "Charlie's Angels". Optionally, the results are presented in a 2-D map on which the main clusters are displayed as continents: the Sport continent, the Entertainment continent, the Health continent, etc. The Clusters, in which the term "Charlie's Angels" appeared, are marked for the user. Of course alternatively this presentation can be a textual presentation or most preferably 3D presentation.

The size of the continent is preferably proportional to the number of Web sites included in that Cluster. Since the Entertainment cluster contains more Web sites than the Sport cluster, it is of greater size in this example.

Figure 8:
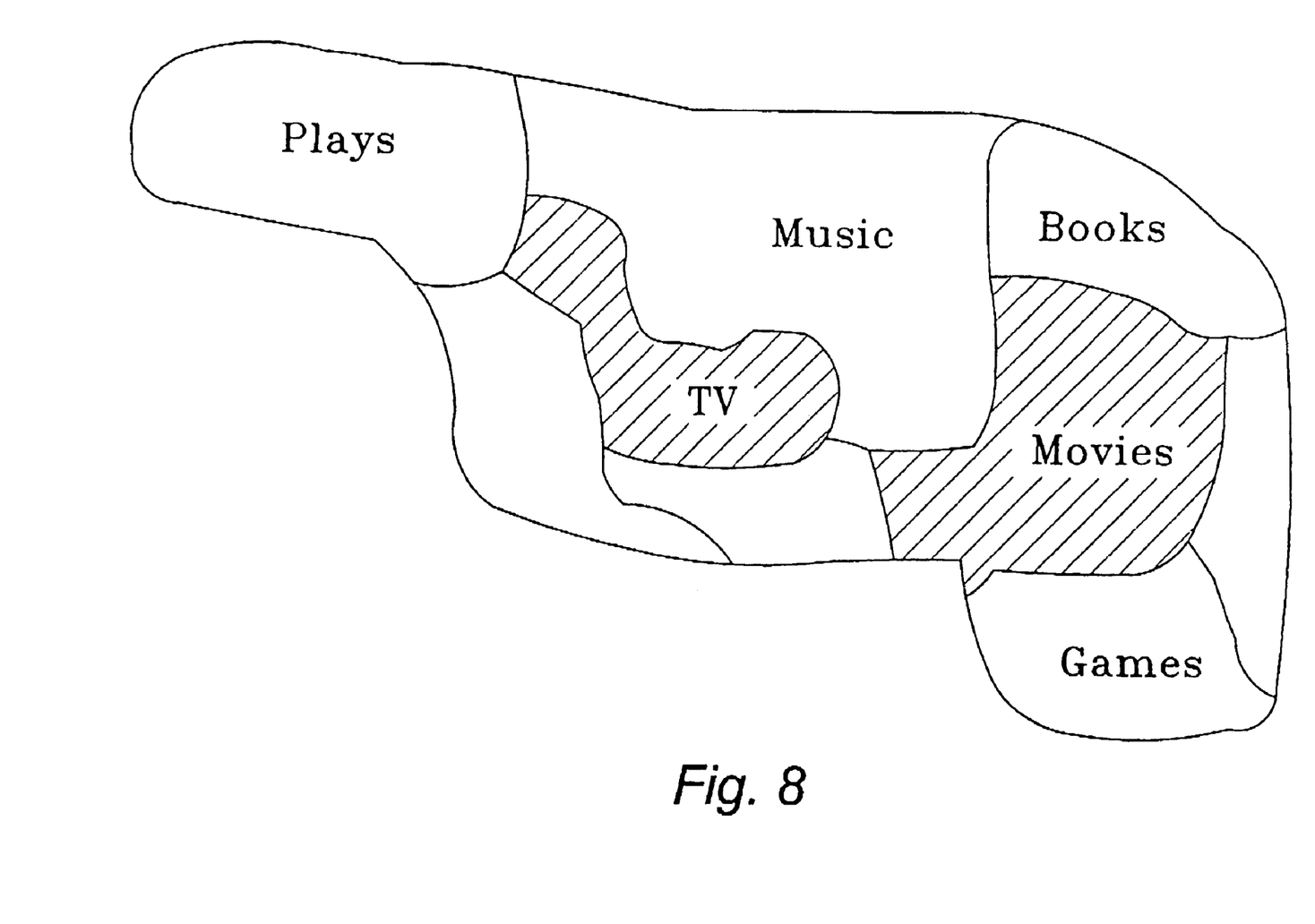
FIG. 8 schematically illustrates an example of a presentation of a stage of a search, according to a preferred embodiment of the invention.

After selecting the Entertainment "continent" (the selection being carried out by clicking the selected object), the user is presented with the "countries"—TV series, Movies, Plays, Music, etc. Again, The countries, in which the search subjects have been found, are being marked to the user (see FIG. 8). The size of the "country" is proportional to the number of the Web sites of this entity.

The relevance of an entity to the search criterion can be visually marked also. For example, as greater the relevance, as highlighted the entity.

Figure 9:
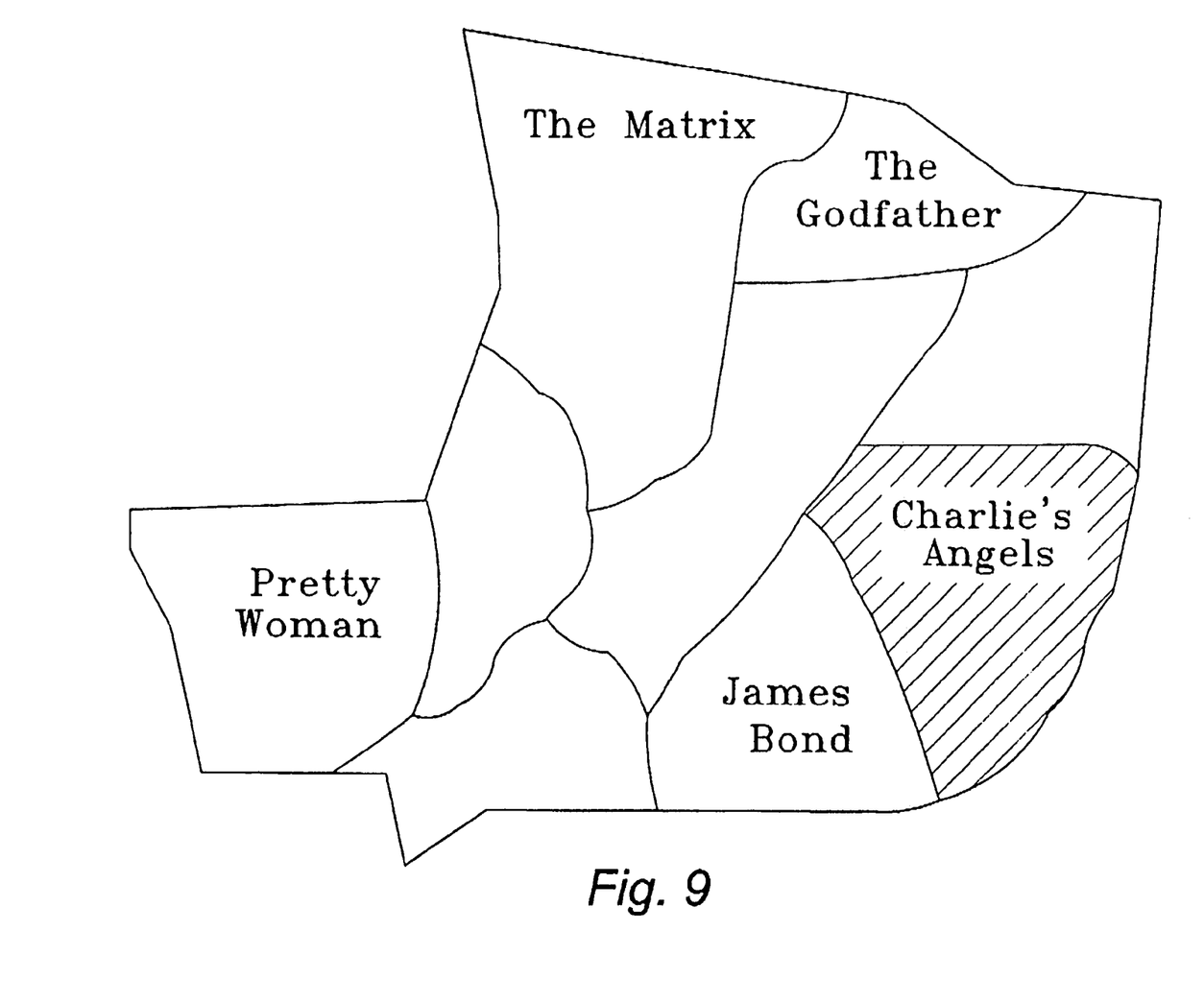
FIG. 9 schematically illustrates an example of a presentation of a further stage of a search, according to a preferred embodiment of the invention.

After selecting the "country", the user is presented with the "cities" in the selected "country", as illustrated in FIG. 9.

Figure 10:
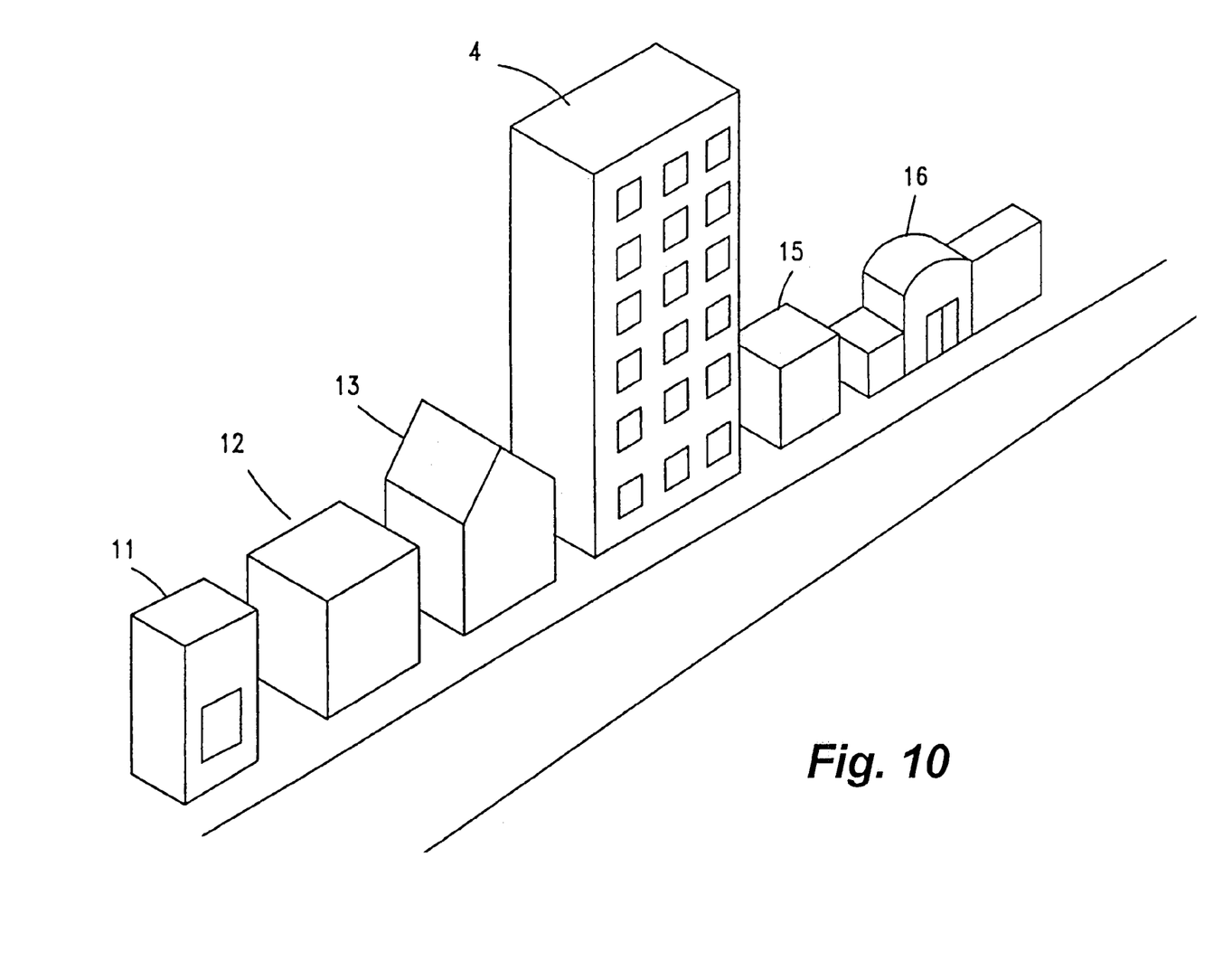
FIG. 10 schematically illustrates an example of a "street" presentation of a group of Web sites found in a Web search, according to an embodiment of the invention.

The last level of the focusing process is the presentation of a street, as described above. FIG. 10 schematically illustrates an example of a "street" presentation of a group of Web sites found in a Web search, according to an embodiment of the invention. The buildings, each represents a Web site, are numbered from 11 to 16. Building 14 represents a Web site, which is owned by an enterprise, hence, its presentation is like an office building. Building 13 represents an amateur Web site and hence, it is presented like a private house. Building 16 represents a Web site that is owned by an academic institute, and therefore is presented like a campus. Building 11 represents a Web site that sells products, for example, it has an e-store, and thus it comprises a display-window. As mentioned above, the height of each building is relative to the number of hyperlinks pointing to and from the Web site represented by it. The width of the Web site represents, for example, the amount of information in the Web site. This parameter can be determined by the amount of words, pages, bytes, and so forth.

It should be noted that the parameters of each Web site, as well as the continents, which are formed according to clusters, are attained and prepared for display by the search engine facility prior to the search by the user, by a process independent of the user search, which is carried out in real time. The application described above is geographically oriented. However, other reference "worlds" may be implemented in order to emphasize the attributes of a Web site.

Figure 11:
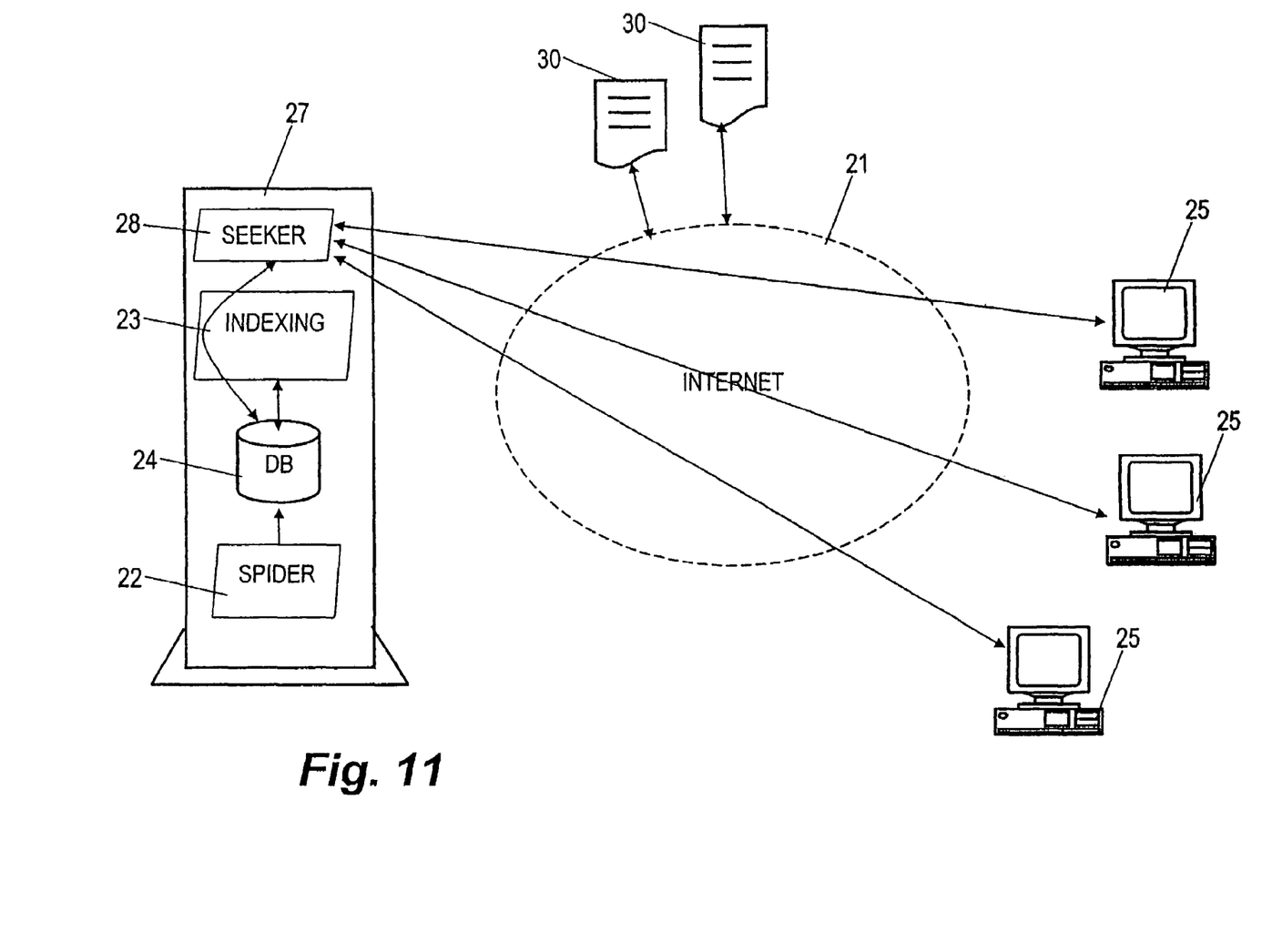
FIG. 11 schematically illustrates a system for searching of Web sites, according to a preferred embodiment of the invention.

FIG. 11 schematically illustrates a system for searching of Web sites, according to a preferred embodiment of the invention.

Web sites 30 are a part of the Internet 21. The Web sites list can be obtained by a Spider program.

The system 27 for providing the capability of searching of Web pages by users 25 is essentially a server with connection to the Internet. It concentrates the activities of indexing and searching. It comprises:
- a Spider program 22, for scanning the Web sites of the Internet;
- a Database 24, for storing the information collected by the Spider program 22;
- an Indexing application 23, for carrying out the clustering, labeling and classification of the Web sites. The indexing is a process, which is carried out independent of the search process, and its purpose is to organize all the Web sites of the Web prior to the search. For example, the indexing concerns organizing all the Web sites in clusters, classifying the Web sites according to predetermined properties, etc.; and
- a Seeker application program/server 28 for interacting with the users 25, carrying out the search (by the appropriate queries to database 24) and for sending the results to the users 25 (usually as Web pages, which usually perform a visual presentation of user's Web browser).

Figure 12:
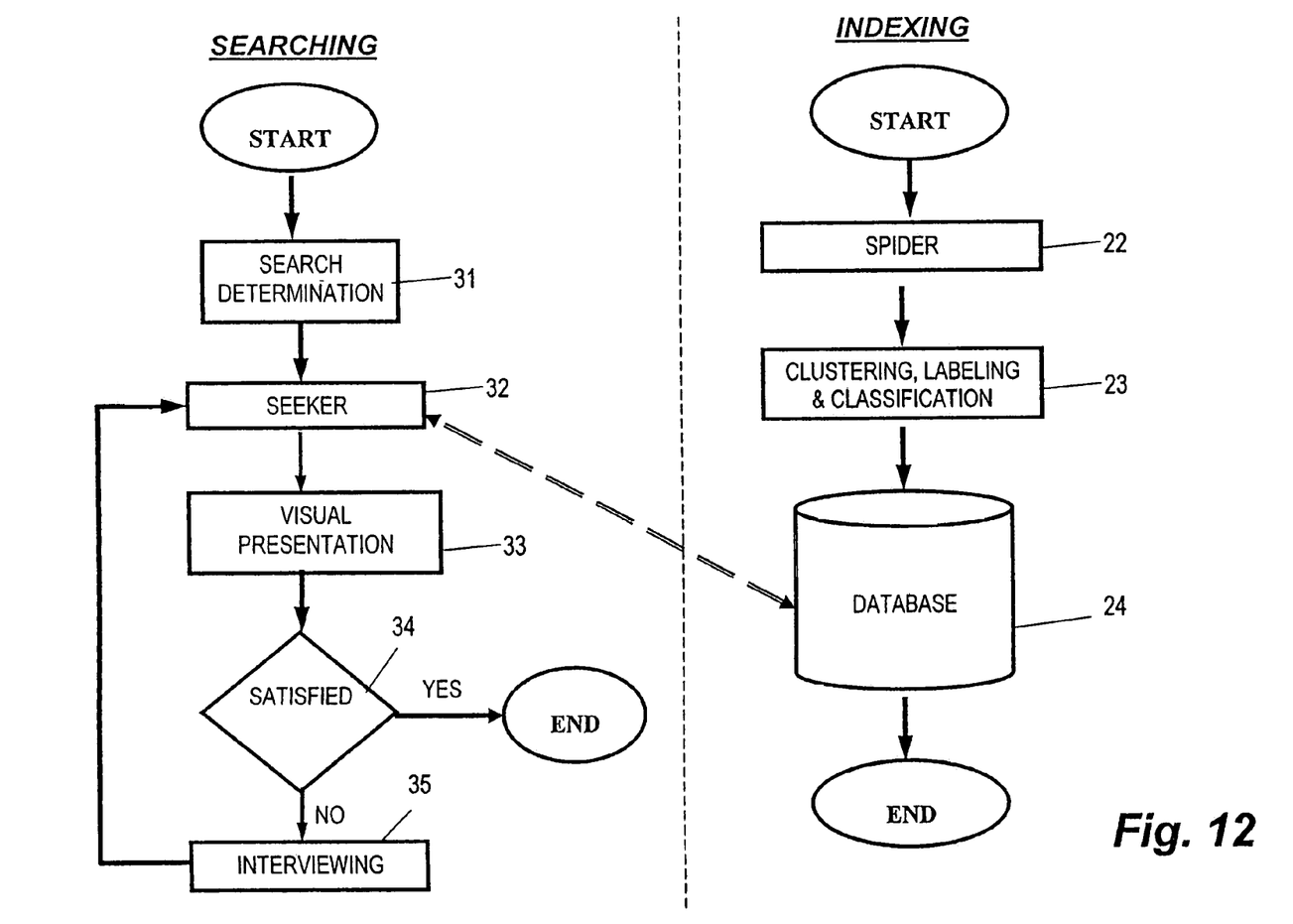
FIG. 12 schematically illustrates a method and system searching of Web sites, according to a preferred embodiment of the invention.

FIG. 12 schematically illustrates a method and system searching of Web sites, according to a preferred embodiment of the invention. Two processes are carried out separately as follows:

Indexing of the Internet.

Searching for Web sites that sustain provided criterion(s).

Indexing: According to an embodiment of the present invention, the Indexing 23 comprises the activities of Clustering, Labeling and Classification of the Web sites according to the predefined attributes, as described above. A Spider program 22 scans the Web sites of the Internet. The found Web sites are added to a database 24. By implementing Clustering method(s) a tree of Clusters is obtained. The gathered information (tree of Clusters, and the list of Web sites and their classification) is stored in database 24.

Searching: The search starts by a user determining the search criterion. Usually the determination is carried out by providing a list of words and the relation between them. The user generally provides the search criterion by interacting via a Web page.

Then a query is posted from the system to database 24, and the results of the query are presented to the user. This stage is carried out by a Seeker program 32. The results of the search may be presented in a textual form or, but preferably in a graphical form described above (marked as 33). If the user is not satisfied with the search results, then the system may interview the user in order to focus the search, and the system posts a new query to the database 24.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for visually presenting a set of properties of a web site, comprising:

predefining within a provider's search engine a set of properties and assigning to each property a visual symbol;

using a spider program, visiting by said provider's search engine each web site and determining those properties from said set that are characteristic to that web site;

associating by said provider's search engine with each web site those symbols corresponding to said determined properties;

forming for each web site a corresponding combined visual representation of the web site based on said associated symbols; and when listing search results to a user, including the combined visual representation for each web site respectively.

2. A method according to claim 1, wherein said set of properties comprises one or more parameters relating to said site's importance, including:

the site's importance, nature of the site's owner, existence of an e-store within said site, existence of a "chat room" within said site, existence of a forum within said site, existence of multimedia file(s) and/or their amount and/or size within said site, frequently used keywords in textual data of said site, whether said site is "official," essence of said site, and/or the amount of information included within the site.

3. A method according to claim 1, wherein said combined visual presentation is presented in 2D or 3D.

4. A method according to claim 1, wherein said combined web site representation is a building.

5. A method according to claim 1, wherein a group of web sites is presented as a street, and each web site in said group is presented as a building within the street.

* * * * *